May 3, 1938. W. KRÄMER 2,116,435
CONTROL CIRCUIT
Filed Sept. 10, 1936

Inventor:
Werner Krämer,
by Harry E. Dunham
His Attorney.

Patented May 3, 1938

2,116,435

UNITED STATES PATENT OFFICE 2,116,435

CONTROL CIRCUIT

Werner Krämer, Berlin-Karlshorst, Germany, assignor to General Electric Company, a corporation of New York Application September 10, 1936, Serial No. 100,123
In Germany October 21, 1935

14 Claims. (Cl. 172—233)

My invention relates to control circuits and more particularly to improvements in static voltage responsive control circuits.

By a static control circuit I mean a control circuit having no moving parts. By voltage responsive control circuit I mean a circuit in which the response of the circuit elements of the control circuit is to voltage, regardless of whether or not the main or primary variable quantity to be controlled is voltage. For example, by various well known means a voltage may be made a function of pressure, speed, current, frequency, etc., and I contemplate the control of any of these primary quantities in this manner by my voltage responsive control circuit.

My invention is well adapted to the control of the direction of operation of a reversible motor for driving an automatic voltage regulator, for in this manner it is possible to eliminate contact making voltmeters, auxiliary relays, etc., and to have a voltage regulator operating motor respond directly to voltage.

Such arrangements are broadly old in the art and my invention is concerned primarily with a novel control circuit for a motor and in the application of this control circuit to an alternating current shunt motor.

Alternating current shunt motors when controlled in accordance with my invention have a relatively large starting torque and the operating torque is largely independent of the speed and also the field current of the motor is substantially independent of armature reaction in the motor.

An object of my invention is to provide a new and improved control system.

Another object of my invention is to provide a new and improved static electro-responsive control system for reversing the current in a control winding in response to an electrical quantity.

My invention will be better understood from the following description taken in connection with the accompanying drawing and its scope will be pointed out in the appended claims.

Figure 1:
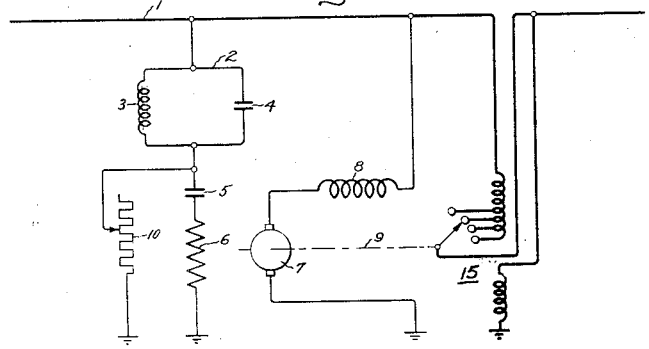
Figure 2:
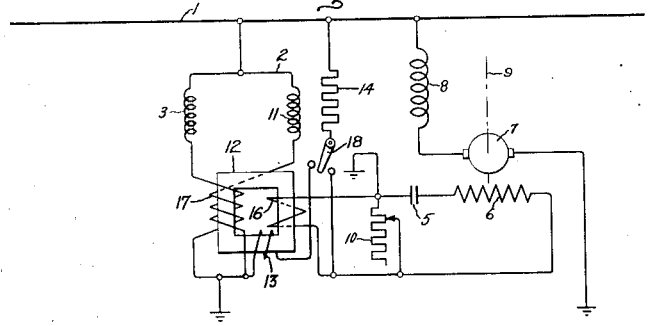
Figure 3:
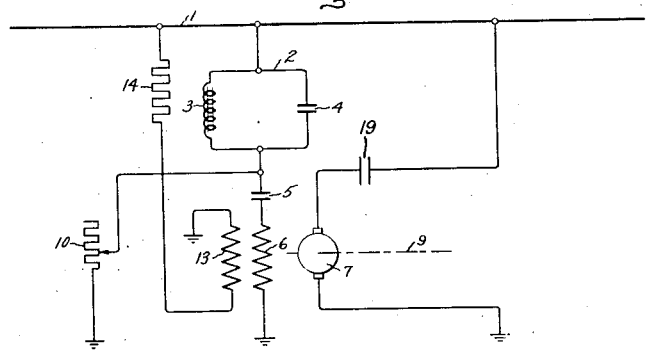

In the drawing Fig. 1 is a diagrammatic showing of a particular embodiment of my invention, Fig. 2 shows a modification thereof, and Fig. 3 shows still another modification.

Referring now to the drawing and more particularly to Fig. 1, there is shown therein a main alternating current circuit 1 which is provided with a ground return so as to simplify the showing of the connections, although it will of course be obvious to those skilled in the art that my invention does not depend upon a ground return and a metallic return can be provided if desired. The main voltage responsive element of my control circuit is a non-linear parallel resonant circuit 2 comprising a saturable core reactor 3 and a capacitor 4 connected in parallel. In order that the parallel resonant circuit be very sensitive to voltage I may provide the reactor with a core having a relatively sharp knee in its saturation curve. One suitable core material having this characteristic is a nickel-iron alloy consisting roughly of 78½% nickel and 21½% iron and known to the trade as Permalloy. Connected in series with the non-linear parallel resonant circuit are a capacitor 5 and a linearly inductive control winding 6. By linearly inductive I mean an inductance which does not change with current such as does the non-linear inductance of a saturable reactor. In the illustrated embodiment of my invention this control winding 6 is the shunt field winding of an alternating current single phase reversible shunt motor.

The capacitor 5 is so correlated to the winding 6 that these two circuit elements form a series resonant circuit at the fundamental frequency of the main alternating current circuit 1.

The armature 7 of the motor is connected to be energized by the circuit 1 by connecting it thereacross through a relatively high reactance, such for example as an inductive winding 8.

The armature 7 is mechanically connected by any suitable means, indicated generally by the reference numeral 9, to operate a voltage regulator 15 for the circuit 1. This regulator may be of any conventional type and is shown by way of example as a tap changing booster transformer.

For adjusting the current in the winding 6 and also providing a relatively low impedance path for harmonic currents through the non-linear resonant circuit I provide an adjustable resistance 10 connected in parallel with the capacitor 5 and the winding 6.

The operation of Fig. 1 is as follows: When the voltage of circuit 1 is at a predetermined normal value at which the parallel resonant circuit 2 is resonant very little current will flow through the control winding 6. However, if the voltage of circuit 1 departs from normal in either direction changes in the saturation of the core of reactor 3 will cause the impedance of the reactor to go out of balance with respect to the capacitance 4 so that the non-linear circuit 2 becomes either inductive as a whole or capacitive as a whole. Consequently, either low power factor leading current or low power factor lagging current will flow through the control winding 6 depending upon how the voltage has departed from normal. By adjusting the resistor 10 the amount of current through the winding 6 can be controlled at will.

The tuning of the series resonant circuit comprising the condenser 5 and control winding 6 causes this circuit to have a relatively low impedance so that the current through it is very sensitive to changes in the non-linear resonant circuit 2. Furthermore, as this series resonant circuit is tuned for the fundamental frequency of the main circuit it offers a very high impedance to harmonic currents which may be produced either in the circuit 1 or by saturation in reactor 3. The resistor 10 being in shunt with the capacitor 5 and control winding 6 offers a bypass path of relatively low impedance for these harmonic currents, however.

The action of the non-linear circuit 2 when it passes through resonance from dissonance to dissonance is such that the phase variation of the current in the winding 6 amounts substantially to a reversal of this current.

The inductive reactance 8 in series with the armature 7 of the shunt motor causes a relatively low power factor lagging current to flow through the armature so that at times when the voltage of the circuit 1 is not normal the currents through the field 6 and armature 7 are either substantially in phase or substantially in phase opposition whereby it will be seen that the motor is reversibly controlled. This reversal is made to operate the tap changing transformer 15 in the proper direction to restore the voltage to normal. As soon as normal voltage is obtained the non-linear circuit 2 becomes resonant and the current in the winding 6 falls substantially to zero whereby the motor comes to rest.

In the modification shown in Fig. 2 the winding 6 is controlled by a modified arrangement consisting of a transformer 12 having a secondary winding 16 and a pair of differentially connected primary windings 17. The secondary winding 16 is connected to energize the series resonant circuit comprising the capacitor 5 and the control winding 6 while the primary windings 17 are connected across the circuit 1 so as to respond to the voltage thereof and they have in series therewith different non-linear elements consisting respectively of the saturable core reactor 3 and an air or non-saturable core reactor 11. This circuit also has a compensating arrangement comprising an auxiliary winding 13 on the transformer, a resistor 14 and a control switch 18.

The operation of Fig. 2 is as follows: The saturable element 3 and the non-saturable element 11 are proportioned so that the currents through the primary windings 17 produce substantially equal and opposite ampere turns with respect to the transformer 12 at normal voltage of circuit 1. If now the voltage departs from normal the changes in saturation in the core of the device 3 will cause the current in one or the other of the differential windings 17 to predominate thereby producing reversed current in the secondary winding 16 and hence in the control winding 6.

Ordinarily at normal voltage the differential ampere turns of the windings 17 will neutralize each other so that no current will be induced in the secondary winding 16. However, due to inaccuracies of construction or setting this is not always possible and consequently an auxiliary winding 13 is provided on the core of the transformer 12 and this winding is connected to respond to the voltage of the circuit 1 through a resistor 14. The ampere turns of this compensating winding 13 may be made to neutralize the effect of any undesirable differential ampere turns produced by the windings 17 at normal voltage.

Another way of securing this compensation is to connect the resistor 14 so that the current through it flows through the secondary winding 16 in a differential manner. This may be done by throwing the control switch 18 to the right instead of to the left. In this manner the secondary winding 16 acts also as the compensating winding 13.

In Fig. 3 a capacitor 19 is substituted for the reactor 8 in series with the armature 7 of the motor. Furthermore the compensating winding 13 is connected as an auxiliary field winding on the motor. The operation of the circuit of Fig. 3 is otherwise the same as Fig. 1. The function of the compensating winding 13 is to neutralize or compensate for the effect of the relatively small current which may flow through the non-linear resonant circuit during normal voltage and when the motor is at rest. This current may sometimes tend to cause the motor to creep or to continue running after it has been started but by means of the winding 13 differentially arranged with respect to the main shunt winding 6 the ampere turns of the field circuit of the motor may be reduced to zero when the voltage of the main circuit 1 is normal.

While I have shown and described particular embodiments of my invention, it will be obvious to those skilled in the art that changes and modifications can be made therein and, consequently, I aim in the appended claims to cover all such changes and modifications as fall within the true spirit and scope of my invention.

What I claim as new and desire to secure by Letters Patent of the United States is:

1. In combination, a variable voltage alternating current circuit, a reversible single phase alternating current shunt motor having an armature element and a field winding element each connected to be energized by said alternating current circuit, and static means for reversing the phase of the current in one of said motor elements with respect to the current in the other of said motor elements in response to the voltage of said circuit, said reversing current being displaced in phase from the voltage of said circuit, and means for equally displacing the phase of the current in the other of said motor elements.

2. In combination, a variable voltage alternating current circuit, a reversible single phase alternating current shunt motor having an armature and a field winding each connected to respond to the voltage of said alternating current circuit, a non-linear resonant circuit connected in series with said field winding and means for displacing by substantially ninety degrees, the phase of the current in said armature with respect to the voltage of said circuit.

3. In combination, an alternating current circuit, a linearly inductive winding connected to be energized by said circuit, means for varying the phase of the current in said winding in response to an electrical condition of said circuit, and a capacitor connected in series with said winding, said capacitor being so proportioned as to neutralize the inductance of said winding with respect to the fundamental frequency of said circuit whereby a high impedance is presented to harmonic currents.

4. In combination, an alternating current circuit, a linearly inductive winding connected to be energized by said circuit, means for varying the phase of the current in said winding in response to an electrical condition of said circuit, a capacitor connected in series with said winding, said capacitor being so proportioned as to neutralize the inductance of said winding with respect to the fundamental frequency of said circuit whereby a high impedance is presented to harmonic currents, and an adjustable resistance connected in parallel with said winding and capacitor for performing the dual function of permitting adjustment of the current strength in said winding and providing a relatively low impedance bypass for harmonic currents.

5. In combination, an alternating current circuit, a reversible alternating current shunt motor adapted to drive a voltage regulator for said circuit, a relatively high reactance connected in series with the armature of said motor across said circuit, and means including a pair of reactance elements having different volt-ampere characteristics connected to reverse vectorially the current in the field winding of said motor in accordance with whether the voltage of said circuit is above or below a predetermined value.

6. In combination, an alternating current circuit, a control winding, a static non-linear circuit arrangement for reversing the phase of the current in said winding in accordance with whether the voltage of said circuit is above or below a predetermined value, said arrangement permitting a relatively small amount of current to flow through said control winding when the voltage of said circuit is at said predetermined value, and means for compensating for said relatively small amount of current.

7. In combination, an alternating current circuit, a linearly inductive control winding connected to respond to the voltage of said circuit, a capacitor in series with said winding for neutralizing the inductance of said winding at the fundamental frequency of said circuit, and a non-linear resonant circuit connected in series with said series connected winding and capacitor, said resonant circuit comprising a parallel connected saturable core reactor and capacitor, said resonant circuit being tuned for resonance at a predetermined voltage of said circuit.

8. In combination, an alternating current circuit, a reversible alternating current single phase shunt motor, a relatively high reactance connected in series with the armature of said motor so as to respond to the voltage of said circuit, a parallel resonant circuit and a capacitor connected in series with the shunt field winding of said motor so as to respond to the voltage of said circuit, said parallel resonant circuit containing a saturable core reactor which is so proportioned that this circuit exhibits parallel resonance at a predetermined voltage of said alternating current circuit, said capacitor being so proportioned as to produce series resonance with said shunt field winding at the fundamental frequency of said alternating current circuit.

9. In combination, an alternating current circuit, a reversible alternating current single phase shunt motor adapted to drive a voltage regulator for said circuit, a relatively highly inductive winding connected in series with the armature of said motor so as to respond to the voltage of said alternating current circuit, a parallel resonant circuit and a capacitor connected in series with the field winding of said motor so as to respond to the voltage of said alternating current circuit, said parallel resonant circuit having a saturable core reactor which produces parallel resonance in said resonant circuit at a predetermined voltage of said alternating current circuit, said capacitor being proportioned to produce series resonance with respect to the field winding of said motor at the fundamental frequency of said alternating current circuit, and an adjustable resistor connected in parallel with said capacitor and field winding.

10. In combination, an alternating current circuit, a reversible alternating current single phase shunt motor connected to be energized in response to the voltage of said circuit, a non-linear parallel resonant circuit connected to reverse vectorially the current in the field winding of said motor in response to the changes in voltage of said circuit, and a differential shunt field winding on said motor proportioned to compensate for the current passed through said parallel non-linear resonant circuit when it is resonant.

11. In combination, an alternating current circuit, a reversible alternating current single phase shunt motor for operating a voltage regulator for said circuit, a capacitor connected in series with the armature of said motor across said alternating current circuit, a non-linear parallel resonant circuit and a capacitor connected in series with the field winding of said motor across said alternating current circuit, said non-linear circuit being proportioned for resonance at a predetermined normal voltage of said alternating current circuit, said capacitor being proportioned for series resonance with respect to the field winding of said motor at the fundamental frequency of said alternating current circuit, and an adjustable resistor connected in parallel with said capacitor and said shunt field winding.

12. In combination, an alternating current circuit, a control winding, means for reversing the current in said control winding in response to the voltage of said circuit comprising a transformer having a secondary winding connected to said control winding and having a pair of differentially connected primary windings, said primary windings being connected in parallel so as to respond to the voltage of said alternating current circuit and having different characteristic non-linear elements connected respectively in series therewith.

13. In combination, an alternating current circuit, a control winding, and means for reversing the current in said winding in accordance to the voltage of said alternating current circuit comprising a transformer having a secondary winding connected to said control winding and having a pair of differential primary windings connected in parallel so as to respond to the voltage of said alternating current circuit, and a saturable core reactor and a non-saturable core reactor connected respectively in series with said primary windings.

14. In combination, an alternating current circuit, a reversible alternating current single phase shunt motor connected to be energized by said circuit, and means for reversing the operation of said motor comprising means for reversing the current in the field winding of said motor comprising a transformer having a secondary winding connected to said field winding and having two differentially connected primary windings connected in parallel across said circuit, there being a saturable core reactor and an air core reactor connected respectively in series with said primary windings, the reactance of said reactors being such that the ampere turns of the primary windings are substantially equal and opposite at a predetermined normal voltage of said circuit.

WERNER KRÄMER.